UNITED STATES PATENT OFFICE 1,934,361

7 ETHOXY 4 METHYL COUMARIN

Arthur A. Levinson, Chicago, Ill., assignor to Selected Chemicals, Inc., Chicago, Ill., a corporation of Illinois No Drawing. Application May 2, 1933
Serial No. 669,076

1 Claim. (Cl. 260—54)

This invention relates to a new compound, which is identified as 7 ethoxy 4 methyl coumarin, which I have discovered and which I have found to have unexpected properties of great value. This new substance is invaluable as a flavoring in food stuffs and a scent in other materials, such as soap, to which it is desired to impart an agreeable odor. One of the invaluable features of this substance is that it has an odor remarkably similar to that of maple, and it possesses many valuable advantages over natural maple products.

The structural formula of the new substance is believed to be as follows:

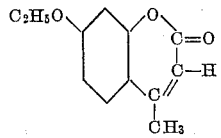

My new compound can be prepared in many ways, and I shall give below three representative most part, is 7 hydroxy 4 methyl coumarin. This substance is sufficiently pure for use in the following process step without purification.

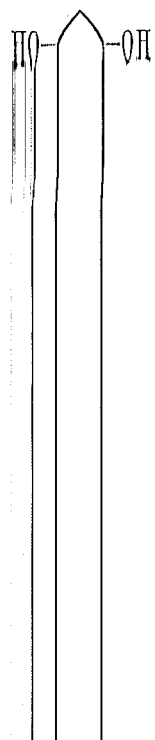

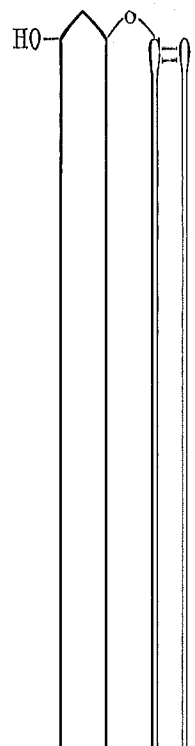

The 7 hydroxy 4 methyl coumarin thus produced is added to an equi-molecular quantity of sodium ethylate dissolved in absolute alcohol or other inert solvent. Approximately 1.05 molecular proportions of an ethyl halide, such as ethyl bromide, is added to the mixture in absolute alcohol, which is then refluxed for a period of twenty-four to forty-eight hours at atmospheric pressure. Similar results may be obtained by heating under pressure at a temperature of from 100° to 125° C. for about one hour. After the reaction is completed, the whole mixture is poured into cold water in order to dissolve the sodium salts and also to precipitate the crude 7 ethoxy 4 methyl coumarin. This product may then be purified by crystallization from ethers, alcohol or other suitable solvents. When pure, the product melts at approximately 115° C. These reactions, in so far as they are understood, are given below.